United States Patent
Takahashi et al.

(10) Patent No.: US 8,189,433 B2
(45) Date of Patent: May 29, 2012

(54) OPTICAL DISK DRIVE DEVICE AND ADDITIONAL RECORDING METHOD

(75) Inventors: Kazuo Takahashi, Hanno (JP); Masaharu Nakano, Kawasaki (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 13/122,101

(22) PCT Filed: Oct. 3, 2008

(86) PCT No.: PCT/JP2008/068068
§ 371 (c)(1),
(2), (4) Date: Apr. 19, 2011

(87) PCT Pub. No.: WO2010/038311
PCT Pub. Date: Apr. 8, 2010

(65) Prior Publication Data
US 2011/0188358 A1    Aug. 4, 2011

(51) Int. Cl.
*G11B 7/004* (2006.01)
(52) U.S. Cl. ............... 369/44.27; 369/44.32; 369/44.34; 369/44.38; 369/94
(58) Field of Classification Search .................. None
See application file for complete search history.

(56) References Cited

U.S. PATENT DOCUMENTS
6,574,174 B1 * 6/2003 Amble et al. ............... 369/44.26

FOREIGN PATENT DOCUMENTS
| JP | 2001-052374 A | 2/2001 |
| JP | 2001-134961 A | 5/2001 |
| JP | 2001-357542 A | 12/2001 |
| JP | 2004-241088 A | 8/2004 |

* cited by examiner

*Primary Examiner* — Wayne Young
*Assistant Examiner* — Brian Butcher
(74) *Attorney, Agent, or Firm* — Sughrue Mion, PLLC

(57) ABSTRACT

Disclosed herein are an optical recording medium driving device and an additional recording method, which performs tracking servo control for moving an objective lens in a direction orthogonal to a tangential direction of a guide track so that a guide tracking error signal is decreased with respect to a guide track of a guide layer separation type recording medium, detects an additional recording start position subsequent to a recorded track if the recorded track is present in a recording layer of the optical recording medium, generates a tracking correction signal according to the reproduction tracking error signal upon tracking servo control of the recorded track just before the additional recording start position, and corrects tracking servo control according to the tracking correction signal upon additional recording start.

7 Claims, 12 Drawing Sheets

OPTICAL DISK DRIVE DEVICE AND ADDITIONAL RECORDING METHOD

CROSS REFERENCE TO RELATED APPLICATION

This application is a National Stage of International Application No. PCT/JP2008/068068 filed Oct. 3, 2008, the contents of all of which are incorporated herein by reference in their entirety.

TECHNICAL FIELD

The present invention relates to an optical disk driving device for an optical recording medium having multiple recording layers and an additional recording method.

BACKGROUND ART

As an optical disk including a plurality of recording layers, a guide layer integration type disk in which a recording layer and a guide layer are formed on the same layer as shown in FIG. 1(a) and a guide layer separation type disk in which a recording layer and a guide layer are separately formed as shown in FIG. 1(b) are known. In the guide layer, a servo signal including position (address) information is recorded as a guide track. In the guide layer integration type disk, even in a non-recorded portion in which information about the recording layer is not recorded, tracking control is possible using the guide track which is integrally formed with the recording layer such that information is recorded on a predetermined track by the guide track. In addition, there is an advantage that information may be recorded and reproduced using a single laser beam.

The guide layer separation type disk requires a laser beam for servo for reading a guide track from the guide layer and a laser beam for recording/reproduction for writing information or reading recorded information on or from the recording layer. When information is recorded on one recording layer, the laser beam for recording/reproduction is condensed on one recording layer while a focal point position of the laser beam for servo moves on the guide track of the guide layer by tracking control, thereby writing information (see Japanese Laid-open Patent Applications No. 2004-241088 and No. 2001-52374). Since the guide layer separation type disk has a simple structure in which the recording layers are laminated, it is possible to easily manufacture the disk. In addition, since multiple recording layers can be more easily formed as compared to the guide layer integration type disk, recording density can be increased.

DISCLOSURE OF THE INVENTION

However, in the guide layer separation type disk, if inclination such as warpage occurs in an optical disk, a positional relationship between the guide track and the recording track of the recording layer is changed. For example, as shown in FIG. 2(a), if the inclination state of the disk relative to an optical axis of the irradiated beam is changed by warpage due to a change in the disk with the passage of time or attachment or detachment of the disk to or from a device after recording is performed while tracking the guide track, as shown in FIG. 2(b), a deviation between the recorded track and the recording track upon additional recording occurs. Such a deviation between the recording tracks causes track pitch unevenness and reproduction performance deterioration. In addition, information may be recorded so as to be superimposed on recorded information of a recorded region such that the recorded information of the recorded region may be corrupted.

The invention has been devised to solve the above problems and an object of the present invention is to provide an optical disk driving device and an additional recording method, which are capable of appropriately performing additional recording without corrupting recorded information, even when the inclination state of an optical recording medium relative to an optical axis of an irradiated beam is changed from the inclination state of the optical recording medium upon previous recording, in the case where additional recording is performed in a guide layer separation type recording medium.

According to the invention of claim 1, there is provided an optical recording medium driving device which performs optical recording or reproduction of information along a guide track with respect to a recording layer of a guide layer separation type optical recording medium in which a guide layer having the guide track including position information formed therein and the recording layer are separately laminated,
comprising: a servo optical system which irradiates a first laser beam for servo to the guide layer through an objective lens so as to detect reflected light; a recording/reproduction optical system which irradiates a second laser beam for recording or reproduction to the recording layer through the objective lens so as to detect reflected light; guide tracking error generation means for generating a guide tracking error signal indicating error from a guide track center of a spot position of the first laser beam irradiated onto the guide layer based on a level of the reflected light detected by the servo optical system; reproduction tracking error generation means for generating a reproduction tracking error signal indicating error from a recording track center of a spot position of the second laser beam irradiated onto the recording layer based on a level of the reflected light detected by the recording/reproduction optical system; tracking control means for performing tracking servo control for moving the objective lens in a direction orthogonal to a tangential direction of the guide track so that the guide tracking error signal is decreased; additional recording start position detection means for detecting an additional recording start position subsequent to a recorded track if the recorded track is present in the recording layer; and tracking correction means for generating a tracking correction signal corresponding to the reproduction tracking error signal during the tracking servo control with respect to the recorded track just before the additional recording start position, wherein the tracking control means corrects the tracking servo control in accordance with the tracking correction signal when additional recording is started.

According to the invention of claim 7, there is provided an additional recording method of an optical recording medium driving device which performs optical recording or reproduction of information along a guide track with respect to a recording layer and includes: a servo optical system for irradiating a first laser beam for servo to the guide layer of a guide layer separation type optical recording medium, in which a guide layer having the guide track including position information formed therein and the recording layer are separately laminated, through an objective lens so as to detect reflected light; a recording/reproduction optical system for irradiating a second laser beam for recording or reproduction to the recording layer through the objective lens so as to detect reflected light; guide tracking error generation means for generating a guide tracking error signal indicating error from a guide track center of a spot position of the first laser beam irradiated onto the guide layer based on a level of the reflected light detected by the servo optical system; reproduction tracking error generation means for generating a reproduction tracking error signal indicating error from a recording track center of a spot position of the second laser beam irradiated onto the recording layer based on a level of the reflected light detected by the recording/reproduction optical system; and tracking control means for performing tracking servo control for moving the objective lens in a direction orthogonal to a tangential direction of the guide track so that the guide tracking error signal is decreased, the additional recording method comprising the steps of: detecting an additional recording start position subsequent to a recorded track if the recorded track is present in the recording layer; generating a tracking correction signal according to the reproduction tracking error signal during the tracking servo control for the recorded track just before the additional recording start position; and correcting the tracking servo control in accordance with the tracking correction signal when additional recording is started.

BEST MODE FOR CARRYING OUT THE INVENTION

According to the optical recording medium driving device of claim 1 and the additional recording method of claim 7, since the tracking correction signal corresponding to the reproduction tracking error signal upon tracking servo control for the recorded track just before the additional recording start position is generated and tracking servo control is corrected in accordance with the tracking correction signal upon additional recording start, it is possible to form the additional recording track subsequent to the recorded track and appropriately perform additional recording of information in the non-recorded region without corrupting the recorded information of the recorded region of the recording layer of the optical recording medium.

EMBODIMENTS

Hereinafter, embodiments of the present invention will be described in detail with reference to the accompanying drawings.

FIG. 3 shows the configuration of an optical disk driving device according to the present invention. This optical disk driving device includes a disk driving system, an optical system and a signal processing system and optically records/reproduces information on/from an optical disk 1 in which a plurality of recording layers is laminated. In this embodiment, it is assumed that a plurality (for example, 16) of recording layers and one guide layer are separately formed in the optical disk 1. In the guide layer, a guide track is formed.

The disk driving system has a structure in which the optical disk 1 is held by a clamp mechanism 2 and is rotated by a motor 3.

The optical system is further divided into a recording/reproduction optical system and a servo optical system.

The recording/reproduction optical system includes a light source 11, a collimator lens 12, beam splitters 13 and 14, a spherical aberration correcting element 15, an objective lens 16, a condensing lens 17 and a light receiving element 18.

The light source 11 is a semiconductor laser element for emitting a laser beam for recording or reproduction (second laser beam). The collimator lens 12 converts the laser beam emitted from the laser source 11 into a parallel light and supplies the parallel light to the beam splitter 13. The beam splitter 13 supplies the parallel laser beam supplied from the collimator lens 12 to the beam splitter 14.

The beam splitter 14 reflects the laser beam incident from the beam splitter 13 at an angle of about 90 degrees and supplies the laser beam to the objective lens 16 through the spherical aberration correcting element 15. The spherical aberration correcting element 15 includes an expander lens or a liquid crystal element and corrects spherical aberration for each recording layer of the optical disk 1. The objective lens 16 condenses the laser beam of the parallel light from the spherical aberration correcting element 15. The objective lens 16 includes an actuator 16a. The actuator 16a includes a focusing portion for moving the objective lens 16 in an optical axis direction and a tracking portion for moving the objective lens 16 in a disk radial direction perpendicular to the optical axis (direction orthogonal to a tangential direction of a guide track).

The laser beam reflected from a certain recording layer of the optical disk 1 returns to the beam splitter 14 through the objective lens 16 and the spherical aberration correcting element 15 as the laser beam of the parallel light. The beam splitter 14 reflects the reflected laser beam at an angle of about 90 degrees and supplies the reflected laser beam to the beam splitter 13. Similarly, the beam splitter 13 reflects the laser beam from the beam splitter 14 at an angle of about 90 degrees and supplies the reflected laser beam to the condensing lens 17. The condensing lens 17 condenses the reflected laser beam onto a light receiving surface of the light receiving element 18 so as to form a spot thereon. The light receiving element 18 has, for example, a light receiving surface divided into four pieces and generates a voltage signal having a level corresponding to received light intensity for each divided surface.

The output voltage signal of the light receiving element 18 is supplied to a reproduction processing circuit (not shown). The reproduction processing circuit generates a reproduction signal of recorded information according to a read signal obtained from the output voltage signal of the light receiving element 18.

The servo optical system commonly uses the beam splitter 14, the spherical aberration correcting element 15 and the objective lens 16, and further includes a light source 21, a collimator lens 22, a beam splitter 23, a condensing lens 24 and a light receiving element 25.

The light source 21 is a semiconductor laser element for emitting a laser beam for servo (first laser beam). The collimator lens 22 converts the laser beam for servo emitted from the light source 21 into parallel light and supplies the parallel light to the beam splitter 23. The beam splitter 23 supplies the parallel laser beam supplied from the collimator lens 22 to the beam splitter 14 without change. The beam splitter 14 supplies the laser beam for servo incident from the beam splitter 23 to the objective lens 16 through the spherical aberration correcting element 15 without change.

The objective lens 16 may condense the laser beam for servo to the guide layer of the optical disk 1 by the focusing portion of the actuator 16a and, at the same time, focus a laser beam for recording or reproduction on any one of the plurality of recording layers. A light spot of the laser beam for servo may be positioned on the guide track of the guide layer by the tracking portion and, at the same time, a light spot may of the laser beam for recording or reproduction may be irradiated at a position corresponding to the guide track of the recording layer.

The laser beam for servo reflected from the guide layer of the optical disk 1 returns to the beam splitter 14 through the objective lens 16 and the spherical aberration correcting element 15 as the laser beam of the parallel light. The beam splitter 14 supplies the reflected laser beam for servo to the beam splitter 23 without change. The beam splitter 23 reflects the laser beam from the beam splitter 14 at an angle of about 90 degrees and supplies the reflected laser beam to the condensing lens 24. The condensing lens 24 condenses the reflected laser beam for servo onto a light receiving surface of the light receiving element 25 so as to form a spot thereon. The light receiving element 25 has, for example, a light receiving surface divided into four pieces and generates a voltage signal having a level corresponding to received light intensity for each divided surface.

In addition, the above-described optical system may move in a radial direction of the optical disk 1 by a transfer driving unit (not shown).

The signal processing system includes a disk driving unit 31, a recording/reproduction light source driving unit 32, a mode switching unit 33, a servo light source driving unit 34, a guide tracking error generation unit 35, a tracking control unit 36, an additional recording start position detection unit 37, a tracking correction unit 38, an objective lens driving unit 39, a focus error generation unit 40, a focus control unit 41, a reproduction tracking error generation unit 42 and a main controller 43.

The disk driving unit 31 rotates and drives the motor 3 according to an instruction from the main controller 43 so as to rotate the optical disk 1. The disk driving unit 31 performs spindle servo control in order to rotate the optical disk 1 at a constant linear velocity.

The mode switching unit 33 switches drive power of the recording/reproduction light source driving unit 32 according to an instruction from the main controller 43. An operation mode includes a recording mode and a reproduction mode. Drive power (recording power) of the recording mode is greater than reproduction power of the reproduction mode. The recording/reproduction light source driving unit 32 drives the light source 11 according to an instruction supplied from the main controller 43 through the mode switching unit 33 so as to emit light. If the light source is driven with reproduction power, the light source 11 emits a laser beam for reproduction and, if the light source is driven with recording power, the light source 11 emits a laser beam for recording.

The servo light source driving unit 4 drives the light source 21 according to an instruction supplied from the main controller 43 so as to emit light.

The guide tracking error generation unit 35 generates a guide tracking error signal according to the output voltage signal of the light receiving element 25. The guide tracking error signal indicates error from a guide track center of the spot position of the laser beam for servo irradiated onto the guide layer. The reproduction tracking error generation unit 42 generates a reproduction tracking error signal according to the output voltage signal of the light receiving element 18. The reproduction tracking error signal indicates error from a recording track center of the spot position of the laser beam for reproduction irradiated onto the recording layer. In order to generate these tracking error signals, for example, a known signal generation method such as a push-pull method may be used. The outputs of the guide tracking error generation unit 35 and the reproduction tracking error generation unit 42 are connected to the tracking control unit 36.

The additional recording start position detection unit 37 determines whether or not a recorded region is present in the optical disk 1 and detects an additional recording start position subsequent to a final recording position of the recorded region if the recorded region is present. For example, a recording region for additional recording start position detection is provided in a first recording layer of the optical disk 1, an additional recording start position (address) is recorded in the recording region for the additional recording start position detection whenever a recording operation is finished, and the recording region for the additional recording start position detection is reproduced just before recording start so as to detect the additional recording start position. Alternatively, the recorded region, that is, the additional recording start position, may be detected by determining whether or not a signal recorded by a recording/reproduction beam is present while searching for the servo beam on the guide layer of the optical disk 1.

The tracking correction unit 38 holds and outputs the reproduction tracking error signal output from the reproduction tracking error generation unit 42 as a tracking correction signal during the below-described tracking servo control.

The tracking control unit 36 performs tracking servo control, receives the guide tracking error signal generated by the guide tracking error generation unit 35, and supplies a tracking control signal to the objective lens driving unit 39, for control of the tracking portion of the actuator 16a. In general, the tracking control signal is generated such that the guide tracking error signal reaches a zero level. In addition, the tracking control unit 36 corrects a tracking servo control operation according to the tracking correction signal from the tracking correction unit 38.

The tracking control unit 36 includes a subtracter 51, a phase compensator 52, a low-frequency gain compensator 53 and a gain adjuster 54, as shown in FIG. 4. The subtracter 51 has a positive terminal and a negative terminal and generates a signal indicating a level difference between a tracking target signal supplied to the positive terminal and the guide tracking error signal supplied to the negative terminal. The tracking target signal generally has a zero level and is a correction value (level) indicated by the tracking correction signal if the tracking correction signal output from the tracking correction unit 38 is the tracking target signal. The phase compensator 52 compensates for the phase of the output signal of the subtracter 51. The low-frequency gain compensator 53 compensates for gain of a low frequency component of the output signal of the phase compensator 52. The gain adjuster 54 adjusts gain of the output signal of the low-frequency gain compensator 53 and outputs the tracking control signal.

The focus error generation unit 40 generates the focus error signal according to the output voltage signal of the light receiving element 25. In order to generate the focus error signal, for example, a known signal generation method such as an astigmatism method may be used. The focus control unit 41 supplies a focus control signal to the objective lens driving unit 39, for focusing control by the objective lens 16. The focus control signal is generated such that the focus error signal reaches a zero level.

The objective lens driving unit 39 drives the tracking portion of the actuator 16a according to the tracking control signal so as to move the objective lens 16 in a disk radial direction which is perpendicular to the optical axis and drives the focusing portion of the actuator 16a according to the focus control signal so as to move the objective lens 16 in the optical axis direction.

The main controller 43 controls ON/OFF of tracking servo control by the tracking control unit 36 and ON/OFF of focusing servo control by the focus control unit 41.

In the optical disk driving device having such a configuration, if information is recorded on the optical disk 1, a recording instruction from an operation unit (not shown) is supplied to the main controller 43. As shown in FIG. 5, the main controller 43 starts a recording operation according to the recording instruction, generates a disk driving instruction with respect to the disk driving unit 31 (step S1) and generates an emission driving instruction of the reproduction mode with respect to the recording/reproduction light source driving unit 32 and the servo light source driving unit 34 (step S2). The disk driving unit 31 drives the motor 3 so as to rotate the optical disk 1, the recording/reproduction light source driving unit 32 drives the light source 11 with reproduction power so as to emit the laser beam for reproduction, and the servo light source driving unit 34 drives the light source 25 so as to emit the laser beam for servo. Further, the main controller 43 instructs the focus control unit 41 to turn focusing servo control on (step S3). By turning focusing servo control on, since a focus servo loop is formed by the servo optical system, the focus error generation unit 40, the focus control unit 41 and the objective lens driving unit 39, the focus control unit 41 generates the focus control signal such that the focus error signal reaches a zero level. Since the position of the objective lens 16 is controlled in the optical axis direction, the focal point of the spot light of the laser beam for servo is positioned on the guide layer of the optical disk 1 and, at the same time, the focal point of the spot light of the laser beam for reproduction is positioned on the recording layer (for example, the first recording layer) of the optical disk 1.

If the focal point of each spot light is set by focusing servo control, the additional recording start position detection unit 37 determines whether or not a recorded region is present in the optical disk 1 from the recording region for additional recording start position detection according to the output signals of the light receiving elements 18 and 25. If the recorded region is present, the additional recording start position subsequent to the final recording position of the recorded region is detected as the recording start position (step S4) and the spot lights by the laser beam for servo and reproduction are moved to the track of the recording start position by the transfer driving unit (step S5). In a non-recorded disk in which a recorded region is not present, an initial address of the first recording layer becomes the recording start position and the spot light is moved to the initial address. The movement of the spot light to the recording start position is performed by the tracking control operation of the tracking control unit 36 according to an instruction from the main controller 43 based on the detection result of the additional recording start position detection unit 37.

When the spot light of the laser beam for reproduction is moved to the track of the recording start position, the main controller 43 instructs the tracking control unit 36 to turn tracking servo control on (step S6). By turning tracking servo control on, since a tracking servo loop is formed by the servo optical system, the guide tracking error generation unit 35, the tracking control unit 36 and the objective lens driving unit 39, the tracking control unit 36 generates the tracking control signal such that the guide tracking error signal reaches a zero level. Since the position of the objective lens 16 in the radial direction is controlled, the spot light of the laser beam for servo is positioned on the guide track of the guide layer of the optical disk 1. If the position of the spot light of the laser beam for servo is set, the position on the recording layer of the spot light of the laser beam for reproduction which moves according to the movement of the spot light of the laser beam for servo is also set.

The additional recording start position detection unit 37 determines whether or not the recorded region is present on the recording layer corresponding to the guide track after movement (step S7). If the additional recording start position detection unit 37 determines that the recorded region is present on the track according to the output signal of the light receiving element 18, the main controller 43 outputs a tracking correction instruction to the tracking control unit 36 and the tracking correction unit 38 according to the determination result (step S8).

The tracking control unit 36 performs tracking servo control using the tracking correction signal output from the tracking correction unit 38 as the tracking target signal in response to the tracking correction instruction. The level of the tracking correction signal is equal to the level of the reproduction tracking error signal when the guide tracking error signal substantially has a zero level. The level of the reproduction tracking error signal when the guide tracking error signal substantially has a zero level corresponds to a deviation amount of the spot light of the laser beam for reproduction corresponding to the recorded track center of the recording layer. Since the tracking control unit 36 generates the tracking control signal such that the level of the guide tracking error signal becomes equal to the level of the tracking correction signal, the level of the reproduction tracking error signal is decreased so as to substantially reach a zero level. That is, the spot light of the laser beam for reproduction is positioned on the recorded track center of the recording layer.

If such tracking correction is performed, the main controller 43 determines whether or not recording actually has started (step S9) and instructs the recording/reproduction light source driving unit 32 to switch to recording mode through the mode switching unit 33 if recording starts (step S10). After recording starts, it is determined whether or not recording is finished (step S11). In the recording mode, the drive power for the light source 11 of the recording/reproduction light source driving unit 32 becomes greater than reproduction power and the light source 11 is driven according to information to be recorded such that the spot light of the modulated laser beam for recording is irradiated onto a non-recorded region of the recording layer. If it is determined that the recorded region is not present on the recording layer in step S7, step S9 is immediately executed.

In an optical disk in which a recorded region is present, if the additional recording start position detection unit 37 detects the additional recording start position as the recording start position, the spot light of the laser beam for servo and the spot light of the laser beam for reproduction are moved to the recording start position. Tracking servo control according to the guide tracking error signal starts at the guide track of the moved position. At this time, if it is detected that the recorded region is present from the output signal of the light receiving element 18, the tracking correction instruction is generated and tracking correction is performed. That is, since the reproduction tracking error signal generated upon tracking servo control is output from the tracking correction unit 38 as the tracking correction signal, the tracking control unit 36 performs tracking servo control using the tracking correction signal as the tracking target signal. Thus, since tracking is performed with respect to the recorded track of the recording layer, if additional recording is performed in the non-recorded region from the recording start position, it is possible to consecutively form a recording track from the recorded track. By warpage due to a change in the optical disk occurring with the passage of time or a difference between recording devices, as shown in FIG. 6, even when tilt (inclination) is present in the optical disk with respect to the optical axis of each laser beam, it is possible to prevent recording from being repeated in the recorded region. That is, it is possible to additionally record information in the non-recorded region without corrupting the recorded information of the recorded region. In addition, it is possible to reduce track pitch unevenness so as to secure reproduction performance. Furthermore, in additional recording, since consecutive recording tracks can be formed, it is possible to reduce a vain recording region so as to improve recording density.

As shown in FIG. 7, if a deviation amount between the recording position when recording is performed in a state in which the optical disk and the optical axis of each laser beam are not inclined and the recording position when recording is performed in a state in which the optical disk and the optical axis of each laser beam are inclined is considered, a deviation in radial direction is greater than a deviation in thickness direction of the disk. For example, if a layer distance d between one recording layer and the guide layer is 300 micrometers and an angle difference e due to inclination of the disk is an angle of 0.1 degree, the deviation amount of the recording track becomes 0.5 micrometer or more (at this time, the deviation amount of the focal point position is 0.005 micrometer or less), tracking correction of this embodiment is particularly effective in radial tilt.

The fact that the guide track and the recording track in the guide layer separation type disk do not strictly coincide with each other in the thickness direction of the disk adversely affects not only additional recording but also reproduction. For example, if the recording state and the reproduction state are different due to change with the passage of time such as inclination of the disk, detrack (off-track) occurs when the recording signal is read by the laser beam for reproduction while performing tracking on the guide layer. At this time, as in the above embodiment, by performing tracking correction based on the reproduction tracking error signal, it is possible to reduce detrack and prevent deterioration of jitter performance or the like.

In the guide layer separation type disk, it is possible to directly perform tracking using the reproduction tracking error signal of the recorded track of the recording layer upon reproduction. In this case, if a crank-shaped portion or a nonconsecutive portion is present in the recording track by additional recording, track skipping may occur upon reproduction or data reproduction of the recording track just after the crank-shaped portion or the inconsecutive portion is difficult. As in the above embodiment, upon additional recording, by smoothly and consecutively forming the recording track, it is possible to stabilize tracking control when directly tracking the recording track upon reproduction, and improve playability.

In the above embodiment, although the tracking correction unit 38 uses the level of the reproduction tracking error signal when the guide tracking error signal is substantially at a zero level by tracking servo control as the tracking correction signal, the tracking correction signal may be generated even by the operation shown in FIG. 8.

The operation for generating the tracking correction signal of FIG. 8 is executed according to the tracking correction instruction in step S8. First, the tracking target signal is decreased by a predetermined level (step S21). Since tracking servo control is performed, both the tracking target signal and the guide tracking error signal just before executing step S21 are substantially at a zero level. If the tracking target signal is decreased by the predetermined level, it is determined whether or not the reproduction tracking error signal is at a zero level (step S22). If the reproduction tracking error signal is not at the zero level, it is determined whether or not the tracking target signal reaches a sweep limit level (step S23). If the tracking target signal does not reach the sweep limit level, the operation returns to step S21 and the tracking target signal is further decreased by the predetermined level. That is, steps S21 to S23 are repeatedly executed if the reproduction tracking error signal does not reach the zero level and the tracking target signal does not reach the sweep limit level.

If the tracking target signal reaches the sweep limit level, the tracking target signal is increased by a predetermined level (step S24). It is determined whether or not the reproduction tracking error signal is at the zero level (step S25). If the reproduction tracking error signal is not at the zero level, the operation returns to step S24 and the tracking target signal is further increased by the predetermined level.

For example, as shown in FIG. 9(*a*), in a state in which the tracking target signal is substantially held at the zero level, the level of the reproduction tracking error signal shows a deviation of the spot light from the recorded track center as shown in FIG. 9(*b*) and the level of the guide tracking error signal is the zero level as shown in FIG. 9(*c*). If the level of the tracking target signal begins to decrease at a time t1 in step S21, the level of the reproduction tracking error signal is increased and the level of the guide tracking error signal is decreased from zero. After that, if the tracking target signal reaches the sweep limit level at a time t2, the level of the tracking target signal begins to increase in step S24. According to the level increase, the level of the reproduction tracking error signal is decreased and the level of the guide tracking error signal is increased. If the reproduction tracking error signal reaches the zero level at a time t3, the tracking target signal is a correction signal indicating tracking correction and is output to the tracking control unit 36. In addition, the level of the guide tracking error signal at this time indicates an offset from the guide track center and tracking servo control is performed upon additional recording start of step S9 while holding the offset.

The tracking correction unit 38 may be configured as shown in FIG. 10. The tracking correction unit 38 of FIG. 10 includes a subtracter 61, a compensator 62, a gain adjuster 63, a sample and hold circuit 64, a switch 65 and a low-pass filter 66. A region signal indicating whether the spot light is in the recorded region or the non-recorded region of the recording layer of the optical disk 1 is supplied from the main controller 43 to the sample and hold circuit 64 and the switch 65.

The subtracter 61 outputs a signal indicating a level difference between the reproduction tracking error signal and the zero level. The compensator 62 includes, for example, a low-pass filter and compensates for the level of the low frequency component of the output signal of the subtracter 61. The gain adjuster 63 adjusts output signal gain of the compensator 62. The sample and hold circuit 64 holds and outputs the output signal of the gain adjuster 63 just before the spot light moves from the recorded region to the non-recorded region of the recording layer according to the region signal from the main controller 43. The switch 65 performs a switching operation according to the region signal, relays the output signal of the gain adjuster 63 to the low-pass filter 66 when the spot light is in the recorded region of the recording layer and relays the output signal of the sample and hold circuit 64 to the low-pass filter 66 when the spot light is in the non-recorded region of the recording layer. The low-pass filter 66 outputs the low frequency component of the signal relayed and supplied by the switch 65 to the tracking control unit 36 as the tracking target signal.

In the tracking correction unit 38 of FIG. 10, since the reproduction tracking error signal is generated with respect to the recorded track when the spot light is in the recorded region of the recording layer, the tracking target signal is generated by a first signal generation system including the subtracter 61, the compensator 62, the gain adjuster 63, the switch 65 and the low-pass filter 66. In contrast, when the spot light is moved from the recorded region to the non-recorded region of the recording layer, since the output signal of the gain adjuster 63 is thereafter held in the sample and hold circuit 64, the tracking target signal is generated by a second signal generation system including the sample and hold circuit 64, the switch 65 and the low-pass filter 66.

Further, the tracking control unit 36 and the tracking correction unit 38 may be configured as shown in FIG. 11. The tracking control unit 36 of FIG. 11 includes a switch 55 in addition to the subtracter 51, the phase compensator 52, the low-frequency gain compensator 53 and the gain adjuster 54 of the tracking control unit 36 of FIG. 4. A region signal indicating whether the spot light is in the recorded region or the non-recorded region of the recording layer of the optical disk 1 is supplied from the main controller 43 to the switch 55. The switch 55 performs a switching operation according to the region signal, relays the reproduction tracking error signal to the negative terminal of the subtracter 51 when the spot light is in the recorded region of the recording layer and relays the guide tracking error signal to the negative terminal of the subtracter 51 when the spot light is in the non-recorded region of the recording layer.

The tracking correction unit 38 of FIG. 11 includes a low-pass filter 67, a sample and hold circuit 68 and a switch 69. A region signal indicating whether the spot light is in the recorded region or the non-recorded region of the recording layer of the optical disk 1 is supplied from the main controller 43 to the sample and hold circuit 68 and the switch 69. The low-pass filter 67 outputs the low frequency component of the guide tracking error signal. The sample and hold circuit 68 holds and outputs the output signal of the low-pass filter 67 just before the spot light moves from the recorded region to the non-recorded region of the recording layer according to the region signal. The switch 69 performs a switching operation according to the region signal, relays a ground level, that is, a zero level, to the positive terminal of the subtracter 51 when the spot light is in the recorded region of the recording layer and relays the output signal of the sample and hold circuit 68 to the positive terminal of the subtracter 51 when the spot light is in the non-recorded region of the recording layer.

In the tracking control unit 36 and the tracking correction unit 38 of FIG. 11, when the spot light is in the recorded region of the recording layer, the reproduction tracking error signal is supplied to the negative terminal of the subtracter 51 through the switch 55 and the zero level is supplied to the positive terminal of the subtracter 51. Accordingly, tracking servo control is performed by the reproduction tracking error signal, and the tracking control signal is generated such that the reproduction tracking error signal reaches the zero level. When the spot light is in the recorded region of the recording region, the low frequency component of the guide tracking error signal is held in the sample and hold circuit 56. In contrast, when the spot light is moved from the recorded region to the non-recorded region of the recording layer, since the output signal of the low-pass filter 55 is thereafter held in the sample and hold circuit 56, the level of the held output, that is, the offset, is supplied to the positive terminal of the subtracter 51 through the switch 69. The guide tracking error signal is supplied to the negative terminal of the subtracter 51. Accordingly, upon additional recording in which the spot light is in the non-recorded region of the recording layer, tracking servo control by the guide tracking error signal is performed and a tracking control signal is generated such that the guide tracking error signal becomes equal to the level of the offset.

FIG. 12 shows an additional configuration included in an output stage of the tracking correction unit 38. A switch 71 and a low-pass filter 72 are further included. A region signal indicating whether the spot light is in the recorded region or the non-recorded region of the recording layer of the optical disk 1 is supplied from the main controller 43 to the switch 71. The switch 71 performs a switching operation according to the region signal, relays the tracking correction signal to the low-pass filter 72 when the spot light is in the recorded region of the recording layer and relays a ground level (zero level) to the low-pass filter 72 when the spot light is in the non-recorded region of the recording layer. The low-pass filter 72 supplies the low frequency component of the signal supplied from the switch 71 to the tracking control unit 36 as the tracking target signal.

In the configuration of the tracking correction unit 38 of FIG. 12, when the spot light is in the recorded region of the recording layer, as described above, the tracking correction signal as the correction (offset) of the guide tracking error signal is output to the tracking control unit 36 through the switch 71 and the low-pass filter 72. When the spot light is moved from the recorded region to the non-recorded region of the recording layer, since the switch 71 relays the ground level to the low-pass filter 72, the input level of the low-pass filter 72 is changed from the level of the tracking correction signal to the zero level as denoted by a dotted line of FIG. 13. The level of the output signal of the low-pass filter 72 is gradually decreased with the passage of time as denoted by a solid line of FIG. 13. Accordingly, in the tracking control unit 36, the tracking correction signal supplied from the tracking correction unit 38 reaches the tracking target signal and the tracking control signal is generated such that the guide tracking error signal becomes equal to the tracking target signal. Thus, upon additional recording of the non-recorded region, the guide tracking error signal is gradually decreased with the passage of time. As shown in FIG. 14, the recording track can be consecutively formed from the recorded track and the recording track formed by additional recording gradually coincides with the guide track in the disk radial direction according to correction decrease. That is, if tracking correction is performed, warpage accumulates between the guide track and the recording track whenever correction is repeated. To this end, deviation between the guide track and the recording track in the radial direction of the disk may be increased. Therefore, correction is gradually decreased so as to return to original control for forming the recording track along the guide track, thereby stabilizing recording.

Alternatively, a variable gain amplifier may be provided instead of the low-pass filter 72 such that the gain of the variable gain amplifier may be decreased when the spot light is moved from the recorded region to the non-recorded layer of the recording layer.

FIG. 15 shows an additional configuration included in an output stage of the tracking correction unit 38. A learning memory 73 is further included. In the recorded region, history of the level of the tracking correction signal for setting the reproduction tracking error signal to the zero level is stored in the learning memory 73. Then, after additional recording start, the tracking correction signal is read from the learning memory 73 and is supplied to the tracking control unit 36 as the tracking target signal, thereby forming the recording track. More specifically, in the recorded region, the tracking correction signal is stored in the learning memory 73 for each a rotation angle range (rotation phase) obtained by dividing one rotation of the optical disk 1 into N pieces and, in the non-recorded region, the tracking correction signal corresponding to the rotation angle range is read and output to the tracking control unit 36 as the tracking target signal. A rotation synchronization pulse output from a rotary encoder or the like of a spindle motor for rotating and driving the optical disk 1 may be used to detect the rotation angle range. By averaging the tracking correction signals (of several times) for each phase, the correction value may be learned.

The recording track formed on the recording layer strictly generates a wave as shown in FIG. 16. Due to tilt of the optical disk and unevenness of layer distance between the guide layer and the recording layer, the positional relationship between the guide track and the recording track is also changed for each rotation angle or at the position of the radial direction. Since the recording track can be formed a predetermined distance from the recorded track, it is possible to accurately perform additional recording, secure reproduction performance or protect the recorded track, and improve recording density.

Although the plurality of recording layers and the single guide layer are included in the optical disk in the above-described embodiments, any optical disk in which at least one recording layer is laminated so as to be separated from a guide layer may be used. In addition, as the optical recording medium, instead of a disk-shaped medium of the embodiments, an optical memory having a plurality of recording layers laminated therein may be used.

The present invention is applicable not only to an optical disk driving device but also to other devices such as a hard disk recording/reproducing device including an optical disk driving device.

REFERENCE NUMERALS

Figure 1:
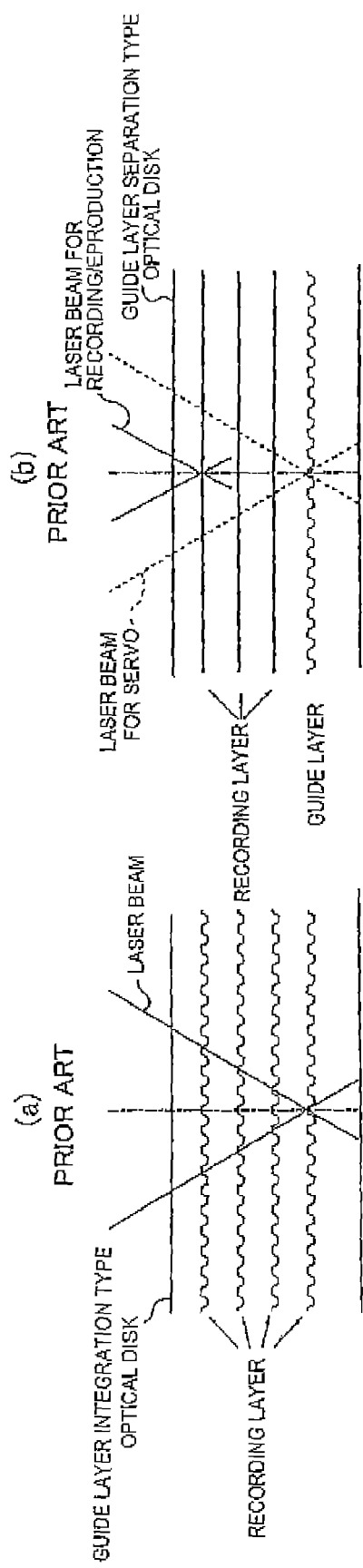
FIG. 1 is a diagram showing the structures of a guide layer integration type disk and a guide layer separation type disk.
Figure 2:
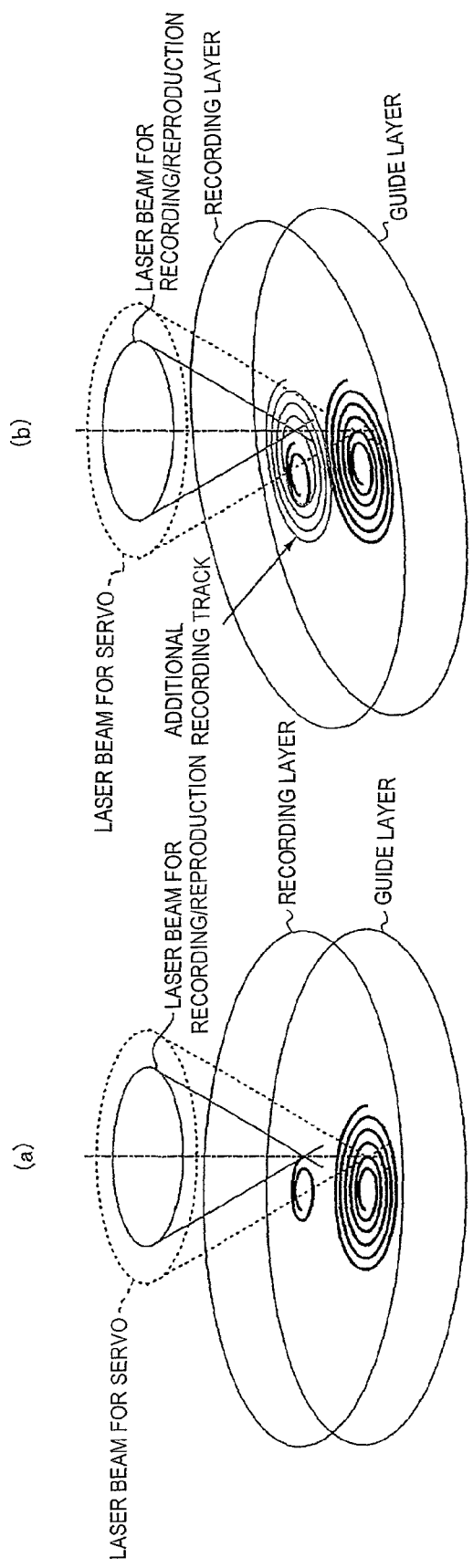
FIG. 2 is a diagram showing a general recording state and a recording state of the case where a disk is inclined upon additional recording
Figure 3:
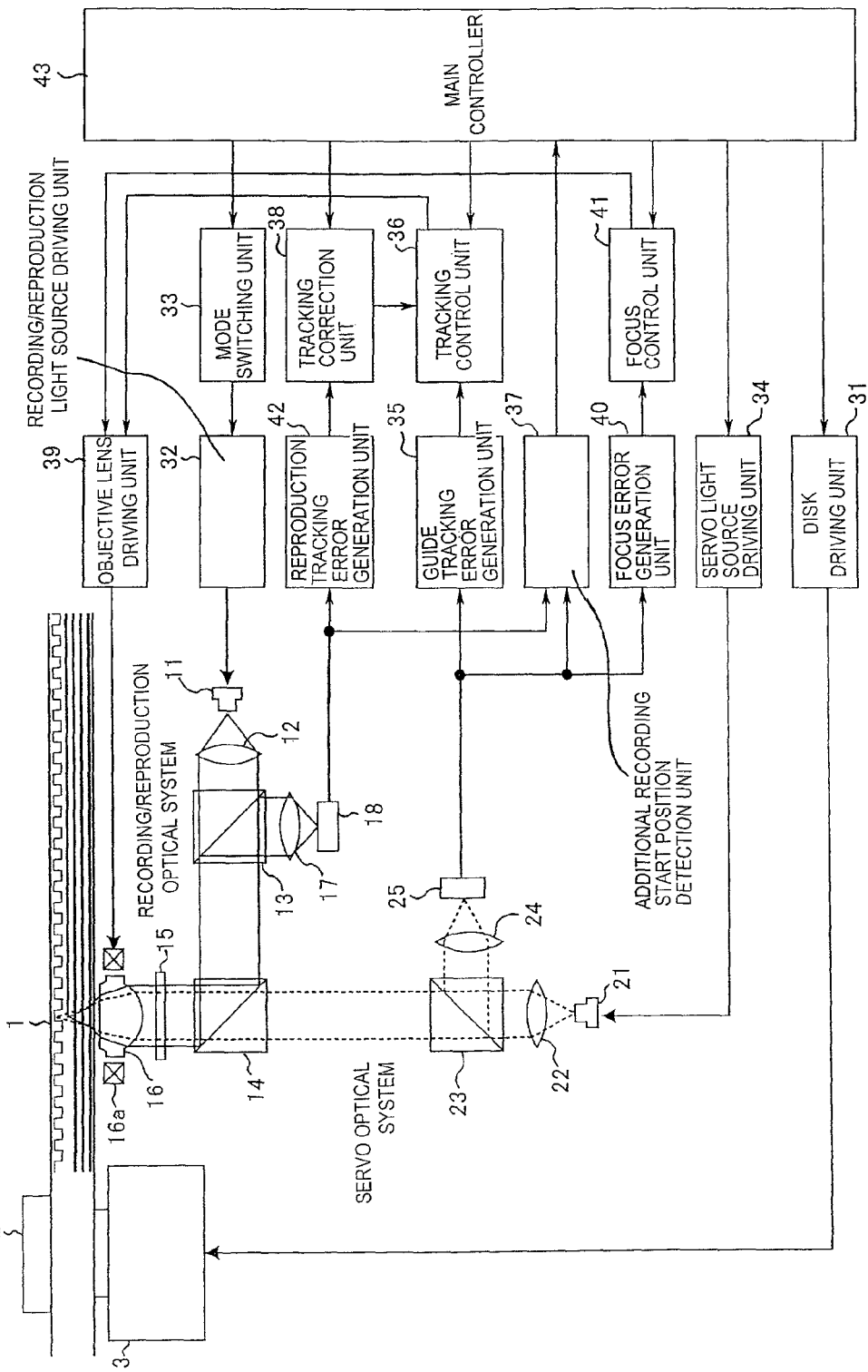
FIG. 3 is a diagram showing a configuration of an optical disk driving device according to an embodiment of the present invention.
Figure 4:
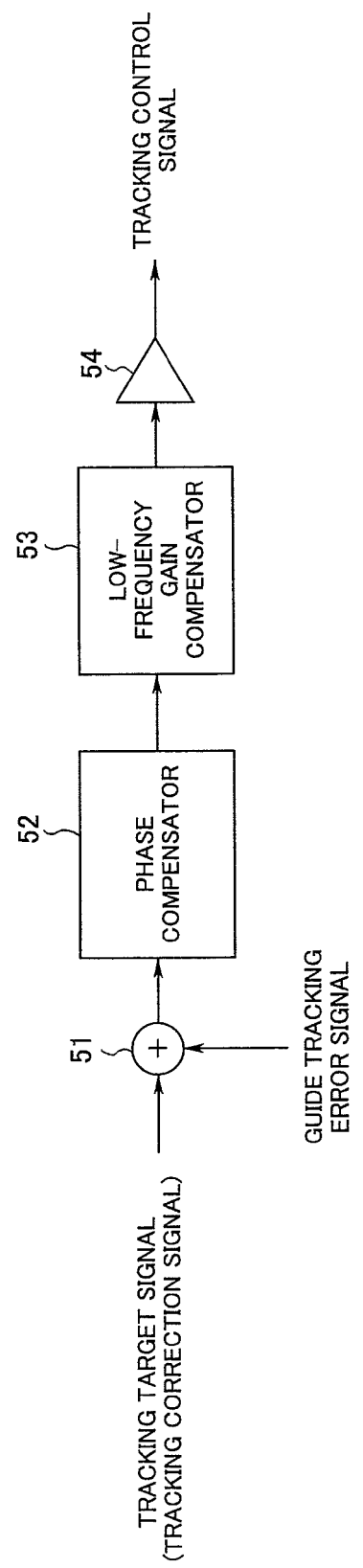
FIG. 4 is a block diagram showing the configuration of a tracking correction unit of FIG. 3.
Figure 5:
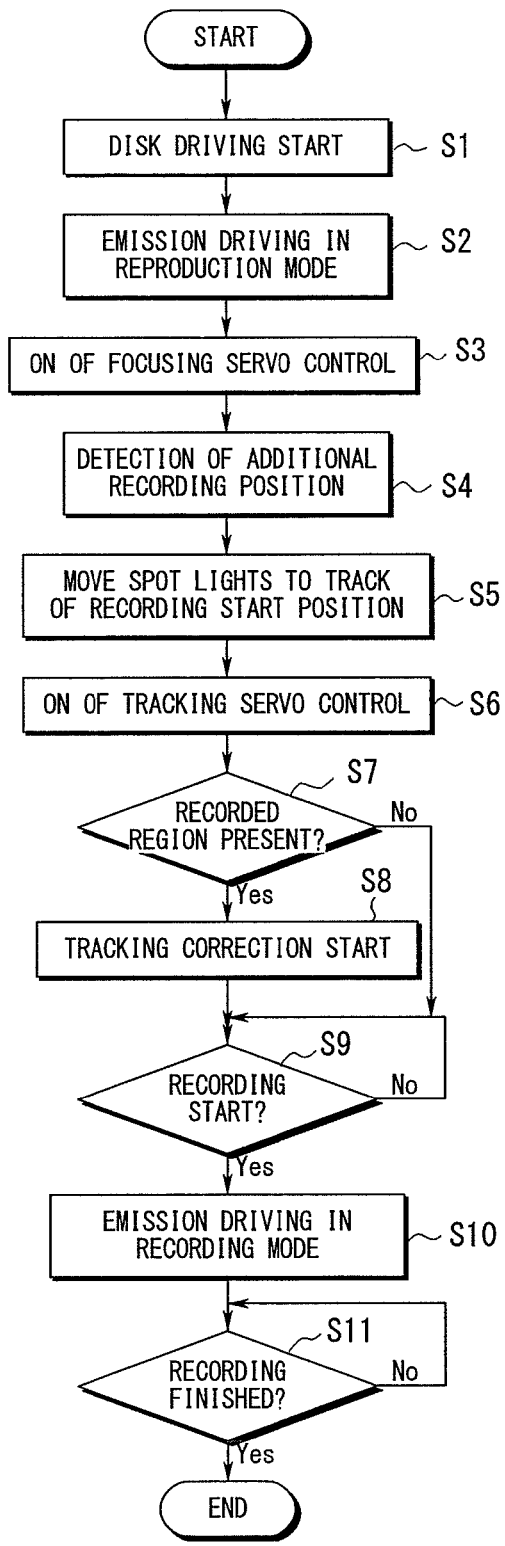
FIG. 5 is a flowchart illustrating a recording operation of the device of FIG. 3.
Figure 6:
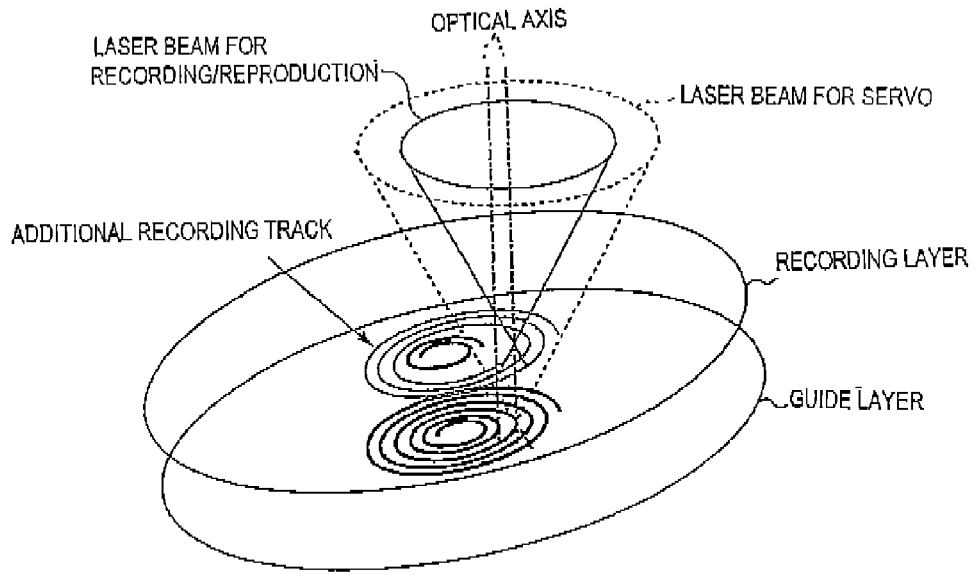
FIG. 6 is a diagram showing a recording state of the case where a disk is inclined upon additional recording.
Figure 7:
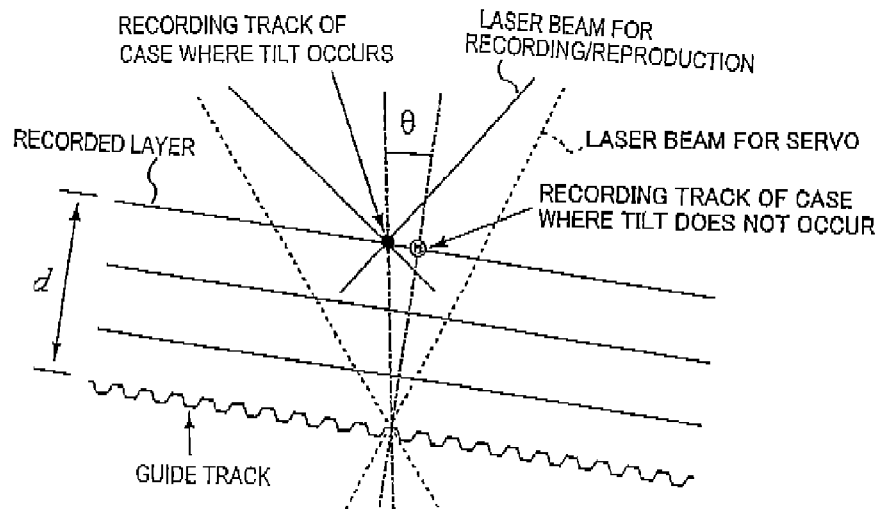
FIG. 7 is a diagram showing an angle difference of a recording track position of the case where a disk is not inclined and the case where a disk is inclined upon additional recording.
Figure 8:
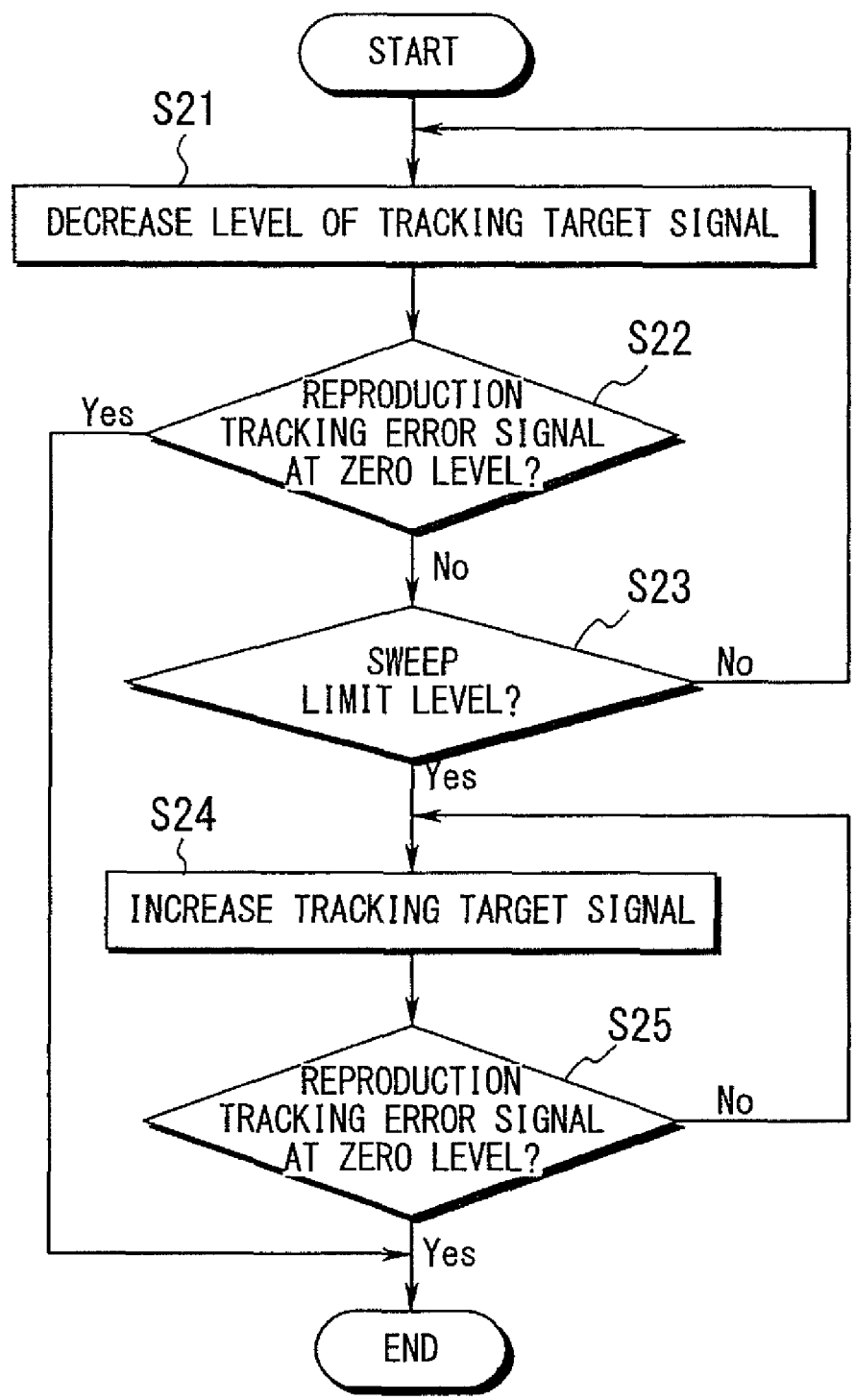
FIG. 8 is a flowchart illustrating an operation for generating a tracking correction signal.
Figure 9:
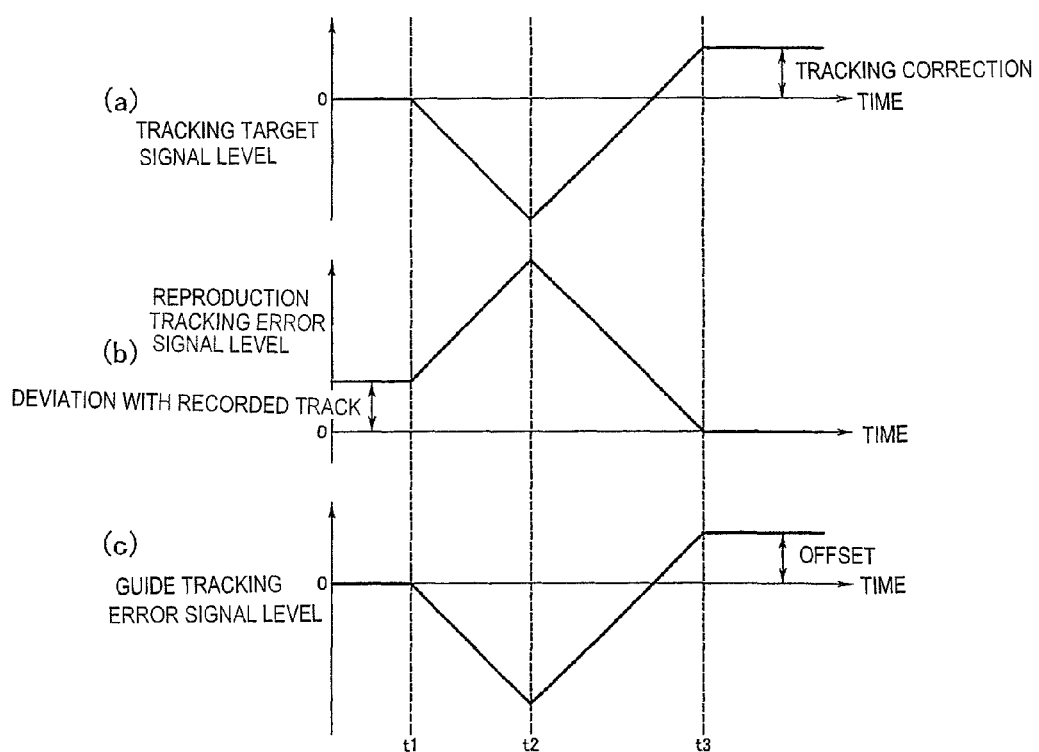
FIG. 9 is a time chart illustrating changes in level in a tracking target signal, a reproduction tracking error signal and a guide tracking error signal by the generation operation of FIG. 8.
Figure 10:
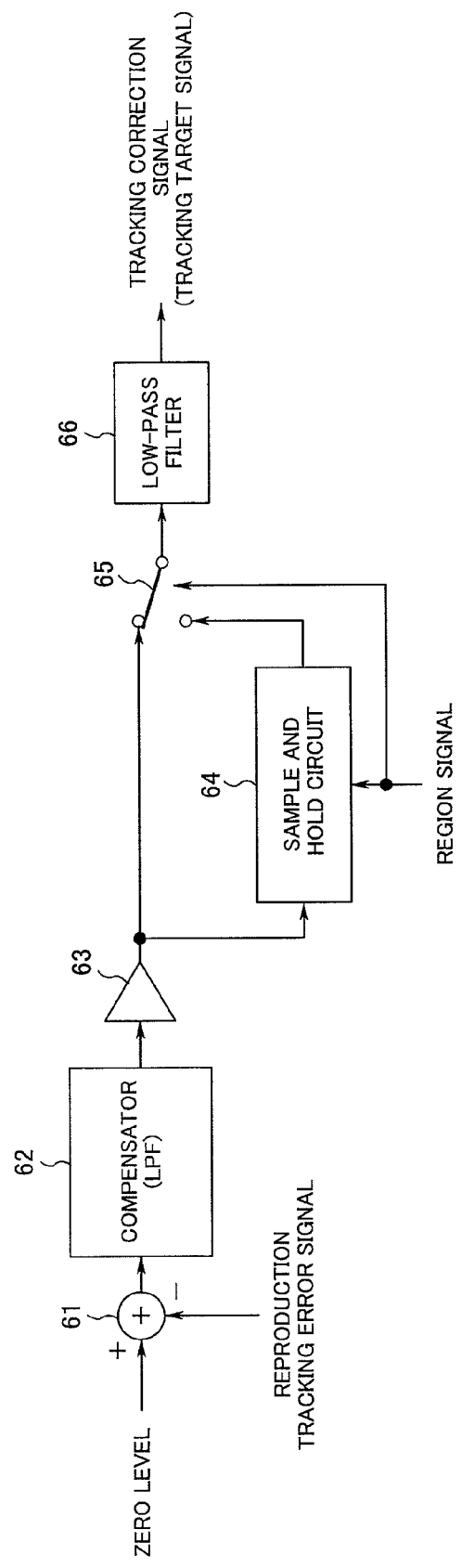
FIG. 10 is a block diagram showing another configuration of the tracking correction unit of FIG. 3.
Figure 11:
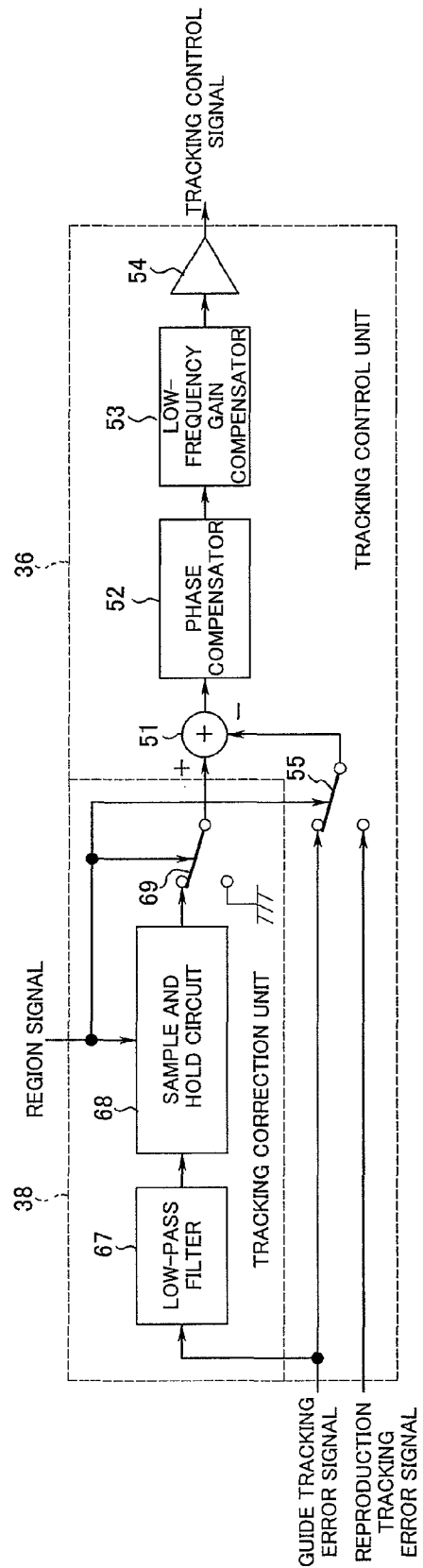
FIG. 11 is a block diagram showing another configuration of the tracking correction unit and the tracking control unit of FIG. 3.
Figure 12:
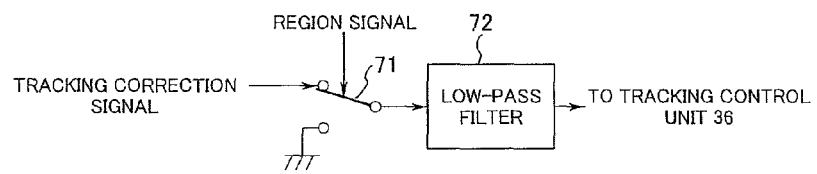
FIG. 12 is a diagram showing a configuration inserted into an output stage of the tracking correction unit of FIG. 3.
Figure 13:
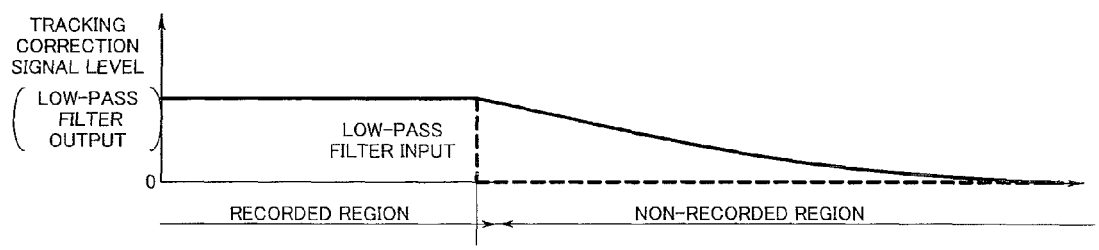
FIG. 13 is a diagram showing a change in signal level by the configuration of FIG. 12.
Figure 14:
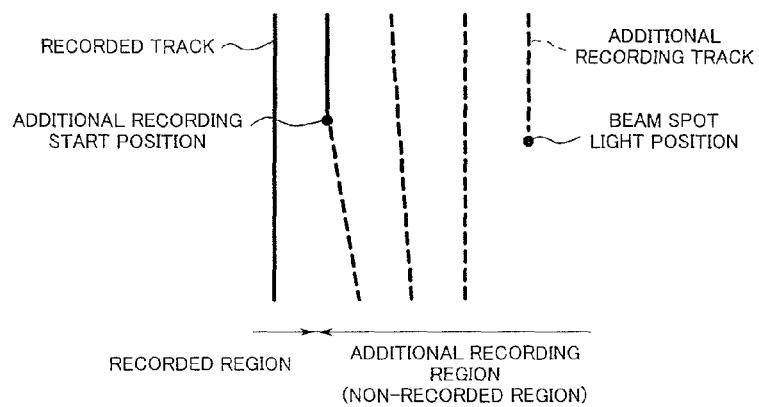
FIG. 14 is a diagram showing a state of forming a recording track in the case of using the configuration of FIG. 12.
Figure 15:
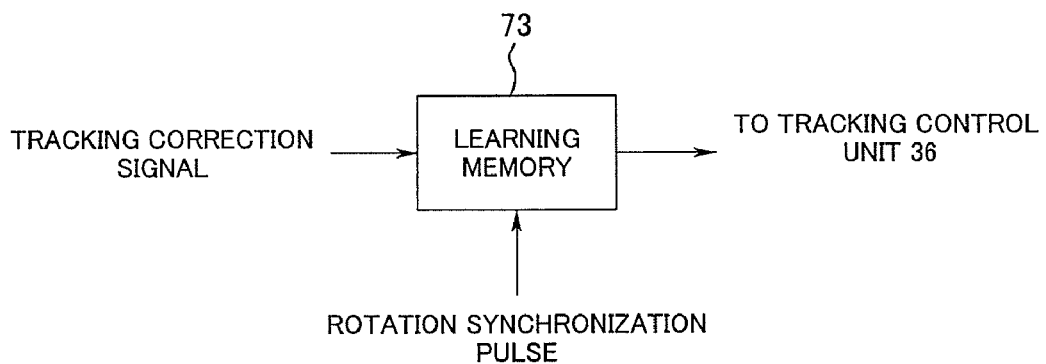
FIG. 15 is a block diagram showing another configuration of the tracking correction unit of FIG. 3.
Figure 16:
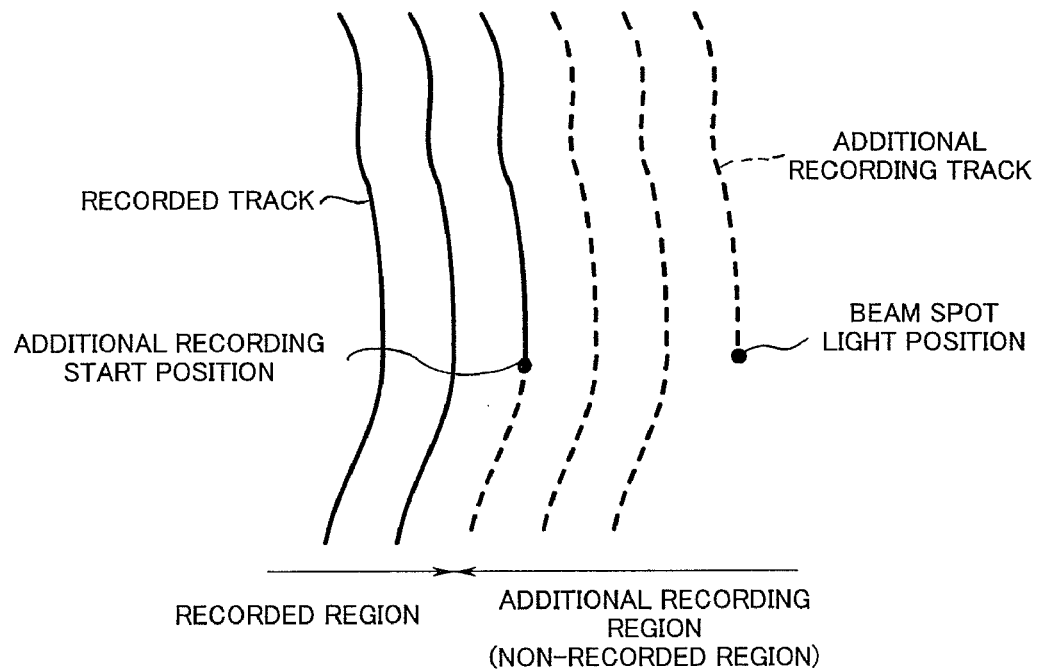
FIG. 16 is a diagram showing a state of forming a recording track in the case of using the configuration of FIG. 15.

1: optical disk
3: motor
11, 21: light source
15: spherical aberration correcting element
16: objective lens
18, 25: light receiving element
37: additional recording start position detection unit
38: tracking correction unit
43: main controller

The invention claimed is:

1. An optical recording medium driving device which performs optical recording or reproduction of information along a guide track with respect to a recording layer of a guide layer separation type optical recording medium in which a guide layer having the guide track including position information formed therein and the recording layer are separately laminated, comprising:
   a servo optical system which irradiates a first laser beam for servo to the guide layer through an objective lens so as to detect reflected light;
   a recording/reproduction optical system which irradiates a second laser beam for recording or reproduction to the recording layer through the objective lens so as to detect reflected light;
   a guide tracking error generation unit which generates a guide tracking error signal indicating error from a guide track center of a spot position of the first laser beam irradiated onto the guide layer based on the reflected light detected by the servo optical system;
   a reproduction tracking error generation unit which generates a reproduction tracking error signal indicating error from a recording track center of a spot position of the second laser beam irradiated onto the recording layer based on the reflected light detected by the recording/reproduction optical system;
   a tracking control unit which performs tracking servo control for moving the objective lens in a direction orthogonal to a tangential direction of the guide track so that the guide tracking error signal is decreased;
   an additional recording start position detection unit which detects an additional recording start position subsequent to a recorded track if the recorded track is present in the recording layer; and
   a tracking correction unit which generates a tracking correction signal corresponding to the reproduction tracking error signal during the tracking servo control with respect to the recorded track just before the additional recording start position,
   wherein the tracking control unit corrects the tracking servo control in accordance with the tracking correction signal when additional recording is started.

2. The optical recording medium driving device according to claim 1, wherein the tracking control unit uses the tracking correction signal as a tracking target signal at a time of the additional recording start and performs the tracking servo control so that a level of the guide tracking error signal becomes equal to a level of the tracking target signal.

3. The optical recording medium driving device according to claim 1, wherein the tracking correction unit gradually decreases a level of the tracking correction signal with the passage of time after the additional recording start.

4. The optical recording medium driving device according to claim 1, wherein the tracking correction unit includes:
- a tracking correction signal generation unit which generates the tracking correction signal so that the reproduction tracking error signal for the recorded track reaches a zero level;
- a sample and hold unit which samples the tracking correction signal generated by the tracking correction signal generation means; and
- a switching unit for outputting the tracking correction signal generated by the tracking correction signal generation unit upon reproduction of the recorded track of the recording layer and outputs the tracking correction signal sampled by the sample and hold unit upon recording in a non-recorded region of the recording layer,
- wherein the tracking control unit uses the tracking correction signal output from the switching unit as a tracking target signal and performs tracking servo control so that a level of the guide tracking error signal becomes equal to a level of the tracking target signal.

5. The optical recording medium driving device according to claim 1, wherein the tracking correction unit includes:
- a sample and hold unit which samples a low frequency component of the guide tracking error signal generated by the guide tracking error generation unit upon reproduction of the recorded track of the recording layer; and
- a switching unit which outputs the tracking correction signal equal to a zero level upon reproduction of the recorded track of the recording layer and which outputs the tracking correction signal equal to a level of the low frequency component sampled by the sample and hold unit upon recording in a non-recorded region of the recording layer,
- wherein the tracking control unit uses the tracking correction signal output from the switching unit as a tracking target signal, performs tracking servo control so that a level of the reproduction tracking error signal becomes equal to a level of the tracking target signal upon reproduction of the recorded track of the recording layer, and performs tracking servo control so that a level of the guide tracking error signal becomes equal to the level of the tracking target signal upon recording in a non-recorded region of the recording layer.

6. The optical recording medium driving device according to claim 1, wherein:
- the optical recording medium includes a disk-shaped medium, and
- the tracking correction unit includes a learning memory unit which stores tracking correction signals for enabling the reproduction tracking error signal to reach a zero level upon reproduction of the recorded track of the recording layer for each predetermined rotation angle range of the optical recording medium and reads and outputs a corresponding tracking correction signal from the tracking correction signals stored for each predetermined rotation angle range of the optical medium upon recording in a non-recorded region of the recording layer.

7. An additional recording method of an optical recording medium driving device which performs optical recording or reproduction of information along a guide track with respect to a recording layer and includes:
- a servo optical system which irradiates a first laser beam for servo to the guide layer of a guide layer separation type optical recording medium, in which a guide layer having the guide track including position information formed therein and the recording layer are separately laminated, through an objective lens so as to detect reflected light;
- a recording/reproduction optical system which irradiates a second laser beam for recording or reproduction to the recording layer through the objective lens so as to detect reflected light;
- a guide tracking error generation unit which generates a guide tracking error signal indicating error from a guide track center of a spot position of the first laser beam irradiated onto the guide layer based on a level of the reflected light detected by the servo optical system;
- a reproduction tracking error generation unit which generates a reproduction tracking error signal indicating error from a recording track center of a spot position of the second laser beam irradiated onto the recording layer based on a level of the reflected light detected by the recording/reproduction optical system; and
- a tracking control unit which performs tracking servo control for moving the objective lens in a direction orthogonal to a tangential direction of the guide track so that the guide tracking error signal is decreased, the additional recording method comprising the steps of:
- detecting an additional recording start position subsequent to a recorded track if the recorded track is present in the recording layer;
- generating a tracking correction signal according to the reproduction tracking error signal during the tracking servo control for the recorded track just before the additional recording start position; and
- correcting the tracking servo control in accordance with the tracking correction signal when additional recording is started.

* * * * *